United States Patent
Shu et al.

(10) Patent No.: US 10,663,040 B2
(45) Date of Patent: May 26, 2020

(54) METHOD AND PRECISION NANOPOSITIONING APPARATUS WITH COMPACT VERTICAL AND HORIZONTAL LINEAR NANOPOSITIONING FLEXURE STAGES FOR IMPLEMENTING ENHANCED NANOPOSITIONING PERFORMANCE

(71) Applicant: UChicago Argonne, LLC, Chicago, IL (US)

(72) Inventors: Deming Shu, Darien, IL (US); Barry Lai, Woodridge, IL (US); Steven P. Kearney, Lombard, IL (US); Jayson W. Anton, Chicago, IL (US); Wenjun Liu, Bolingbrook, IL (US); Jorg M. Maser, Oak Park, IL (US); Christian Roehrig, Plainfield, IL (US); Jonathan Z. Tischler, Lisle, IL (US)

(73) Assignee: UChicago Argonne, LLC, Chicago, IL (US)

(*) Notice: Subject to any disclaimer, the term of this patent is extended or adjusted under 35 U.S.C. 154(b) by 551 days.

(21) Appl. No.: 15/662,086

(22) Filed: Jul. 27, 2017

(65) Prior Publication Data
US 2019/0032759 A1   Jan. 31, 2019

(51) Int. Cl.
F16H 21/04   (2006.01)
H02N 2/02   (2006.01)
H02N 2/04   (2006.01)

(52) U.S. Cl.
CPC .............. *F16H 21/04* (2013.01); *H02N 2/028* (2013.01); *H02N 2/043* (2013.01)

(58) Field of Classification Search
CPC combination set(s) only.
See application file for complete search history.

(56) References Cited

U.S. PATENT DOCUMENTS

| | | |
|---|---|---|
| 4,776,696 A | 10/1988 | Hettrick et al. |
| 5,526,903 A | 6/1996 | Shu et al. |
| 5,896,200 A | 4/1999 | Shu et al. |
| 6,607,840 B2 | 8/2003 | Shu et al. |
| 6,984,335 B2 | 1/2006 | Shu et al. |
| 7,331,714 B2 | 2/2008 | Shu et al. |
| 7,597,475 B1 | 10/2009 | Shu et al. |
| 8,089,199 B2 | 1/2012 | Shu et al. |
| 8,159,114 B2 * | 4/2012 | Rahman ............... E21B 23/00 310/328 |
| 8,526,575 B1 | 9/2013 | Lyon et al. |
| 9,613,629 B2 | 4/2017 | Shu et al. |

(Continued)

OTHER PUBLICATIONS

D. Shu, B. Lai, S. Kearney, J. Anton, W. Liu, J. Maser, C. Roehrig, and J. Z. Tischler, "Mechanical design of compact vertical and horizontal linear nanopositioning flexure stages with centimeter-level travel range for x-ray beamline instrumentation," Proceedings of IPAC2017, Copenhagen, Denmark, THPAB154, ISBN 978-3-95450-182-3, May 2017.

(Continued)

*Primary Examiner* — Bryan P Gordon
(74) *Attorney, Agent, or Firm* — Joan Pennington

(57) ABSTRACT

An enhanced method and precision nanopositioning apparatus for implementing enhanced nanopositioning performance is provided. The nanopositioning apparatus includes a vertical linear nanopositioning flexure stage and a horizontal linear nanopositioning flexure stage. The vertical linear nanopositioning flexure stage includes a stage base, a symmetrically configured flexure linear guiding mechanism with precision motion enhancement structure, and a stage carriage. The horizontal linear nanopositioning flexure stage is mounted on the stage carriage of the vertical linear nanopositioning flexure stage, and includes a middle-bar relative position control mechanism to enhance the stiffness of a flexure linear guiding mechanism.

20 Claims, 13 Drawing Sheets

(56) References Cited

U.S. PATENT DOCUMENTS

| | | | | |
|---|---|---|---|---|
| 2006/0243761 | A1* | 11/2006 | Kokubo | G11B 7/265 |
| | | | | 222/607 |
| 2009/0023607 | A1* | 1/2009 | Rozhok | B82Y 10/00 |
| | | | | 506/30 |
| 2010/0301710 | A1* | 12/2010 | Pryadkin | B82Y 35/00 |
| | | | | 310/355 |
| 2013/0212749 | A1* | 8/2013 | Watanabe | G01Q 10/04 |
| | | | | 850/4 |

OTHER PUBLICATIONS

Shu et al., "Design of a precision flexural linear stage system with subnanometer resolution and 12-mm travel range," 11th International Conference on Synchrotron Radiation Instrumentation (SRI 2012), Journal of Physics: Conference Series 425 (2013) 212011, pp. 1-4, 2012.

Shu et al., "Mechanical Design and Development of Compact Linear Nanopositioning Flexure Stages With Centimeter-Level Travel Range and Nanometer-Level Resolution", pp. 1-4, Sep. 11, 2016.

Shu et al., "Mechanical design of a precision linear flexural stage for 3-D x-ray diffraction microscope at the Advanced Photon Source". SPIE 2015.

Shu et al., "Mechanical Design of Compact Vertical and Horizontal Linear Nanopositioning Flexure Stages with Centimeter-Level Travel Range for X-ray Beamline Instrumentation" Abstract, Sep. 2016.

Shu et al., Design and Test of Precision Vertical and Horizontal Linear Nanopositioning Flexure Stages with Centimeter-Level Travel Range for X-ray Instrumentation, SPIE, 2017.

\* cited by examiner

METHOD AND PRECISION NANOPOSITIONING APPARATUS WITH COMPACT VERTICAL AND HORIZONTAL LINEAR NANOPOSITIONING FLEXURE STAGES FOR IMPLEMENTING ENHANCED NANOPOSITIONING PERFORMANCE

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates generally to precision positioning stage systems, and more particularly, relates to a method and apparatus with compact vertical and horizontal linear nanopositioning flexure stages for implementing enhanced nanopositioning performance, for example, for X-ray beamline instrumentation and many photon beam lines optics with repeatable and stable nanopositioning requirements.

DESCRIPTION OF THE RELATED ART

There are many synchrotron radiation instrument applications requiring repeatable, stable and a very high reproducibility for multidimensional linear positioning systems, for example, with nanometer resolution. Many photon beam lines optics have repeatable and stable nanopositioning requirements.

Nanopositioning techniques present an important capability to support the state-of-the-art synchrotron radiation instrumentation research for the Advanced Photon Source (APS) operations and upgrade project. To overcome the performance limitations of precision ball-bearing-based or roller-bearing-based linear stage systems, compact vertical and horizontal linear nanopositioning flexure stages have been designed and developed at the APS with centimeter-level travel range and nanometer-level resolution for x-ray beamline instrumentation applications.

U.S. Pat. No. 8,957,567 issued Feb. 17, 2015 to Deming Shu, Steven P. Kearney, and Curt A. Preissner, discloses a method and deformation compensated flexural pivots structured for precision linear nanopositioning stages. A deformation-compensated flexural linear guiding mechanism includes a basic parallel mechanism including a U-shaped member and a pair of parallel bars linked to respective pairs of I-link bars and each of the I-bars coupled by a respective pair of flexural pivots. The basic parallel mechanism includes substantially evenly distributed flexural pivots minimizing center shift dynamic errors.

U.S. Pat. No. 7,994,688 by Deming Shu and Jorg M. Maser and assigned to the present assignee discloses a novel mechanical design for laminar weak-link mechanisms with centimeter-level travel range and sub-nanometer positioning resolution. An enhanced mechanical design for laminar weak-link mechanisms is provided with centimeter-level travel range and sub-nanometer positioning resolution. A multiple parallelogram weak-link structure includes a predefined pattern of a plurality of perpendicularly arranged groups of connecting links, each link having at least one pair of weak-link connections. Each of the plurality of perpendicularly arranged groups includes a terminal for mounting to a fixed base. The multiple parallelogram weak-link structure includes a moving part for mounting on a carriage, providing precisely controlled movement with stability in one direction. A two-dimensional (2D) ultra-precision scanning stages assembly for x-ray nanoprobe applications includes multiple redundantly constrained weak-link structures, a vertical ultra-precision positioning stage, and a horizontal ultra-precision positioning stage.

Commercial-precision ball-bearing-based or roller-bearing-based linear positioning stages are capable of providing larger travel range with compact sizes. However, their linear motion straightness of trajectory is usually not repeatable due to the roundness errors of the bearing's rolling element and the uncertainty of the rolling ball's or roller's sliding effect. For many synchrotron radiation instrument applications, compact flexure stages with repeatable and stable nanopositioning performance will simplify the control mechanism for the design of multi-dimensional scanning or alignment apparatus. Using commercial flexural pivots, several design enhancements developed at the APS make the traditional parallel mechanism more precise and compact.

Typically traditional parallel mechanisms can provide a precise linear motion if the length of the link-bar for the parallel mechanism is long enough to minimize the rotation angle on each of the flexural pivots. However, in the case of the compact linear flexure stage design, the length of the link-bar is limited by the requirement for the stage overall dimensions.

A need exists to provide improved method and apparatus with compact vertical and horizontal linear nanopositioning flexure stages for implementing enhanced nanopositioning performance.

SUMMARY OF THE INVENTION

Principal aspects of the present invention are to provide a method and apparatus with compact vertical and horizontal linear nanopositioning flexure stages for implementing enhanced nanopositioning performance. Other important aspects of the present invention are to provide such method and apparatus substantially without negative effect and that overcome some of the disadvantages of prior art arrangements.

In brief, an enhanced method and precision nanopositioning apparatus for implementing enhanced nanopositioning performance is provided. The nanopositioning apparatus includes a vertical linear nanopositioning flexure stage and a horizontal linear nanopositioning flexure stage. The vertical linear nanopositioning flexure stage includes a stage base, a symmetrically configured flexure linear guiding mechanism with precision motion enhancement structure, and a stage carriage. The horizontal linear nanopositioning flexure stage is carried on the stage carriage of the vertical linear nanopositioning flexure stage, and includes a middle-bar relative position control mechanism to enhance the stiffness of a flexure linear guiding mechanism.

In accordance with features of the invention, both the vertical linear nanopositioning flexure stage and the horizontal linear nanopositioning flexure stage include a decoupled linear driving mechanism, for example, driven by a micro-step stepper motor with harmonic gearhead. The horizontal linear nanopositioning flexure stage with a linear grating encoder.

In accordance with features of the invention, the vertical flexure linear guiding mechanism has a symmetric structure with four vertical guiding panels. Each guiding panel includes two sets of the deformation-compensated flexural-pivots-based linear guiding mechanisms which are mounted vertically between the stage base and carriage to provide a precision frictionless vertical motion guiding.

In accordance with features of the invention, the vertical linear nanopositioning flexure stage has a total of eight sets of flexural guiding mechanisms applied on the stage.

In accordance with features of the invention, to implement the precision motion enhancement for this symmetric linear guiding structure, special weak-link mechanisms are applied to the middle-bar motion synchronizing linkage to compensate relative motions between the middle-bars. The synchronizing linkages between the U-shaped middle bars of the guiding mechanisms integrate the eight sets of guiding mechanisms into a united stage guiding system.

In accordance with features of the invention, a special 1:2 ratio flexure mechanism is applied to the linear stage to provide a backlash-free reliable 1:2 positioning link between the middle-bar and the carriage of the stage.

In accordance with features of the invention, the horizontal linear nanopositioning flexure stage includes three sets of deformation-compensated flexural linear guiding mechanisms. Two sets of the linear guiding mechanisms are mounted vertically between the stage base and carriage. One set of the linear guiding mechanism links the stage base and carriage horizontally. Synchronizing linkages between the U-shaped middle bars of the three sets of guiding mechanisms integrate the three sets of guiding mechanisms into a united guiding system.

In accordance with features of the invention, the nanopositioning apparatus includes the vertical linear nanopositioning flexure stage and the horizontal linear nanopositioning flexure stage provide special performance for structural stability and repeatability in nanometer scale with a compact structure for kilograms-level load capacity and scalability.

In accordance with features of the invention, the nanopositioning apparatus includes the vertical linear nanopositioning flexure stage and the horizontal linear nanopositioning flexure stage provide nanopositioning resolution, repeatability, and stability in a nanometer scale with multi-dimensional alignment capability in various environments.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
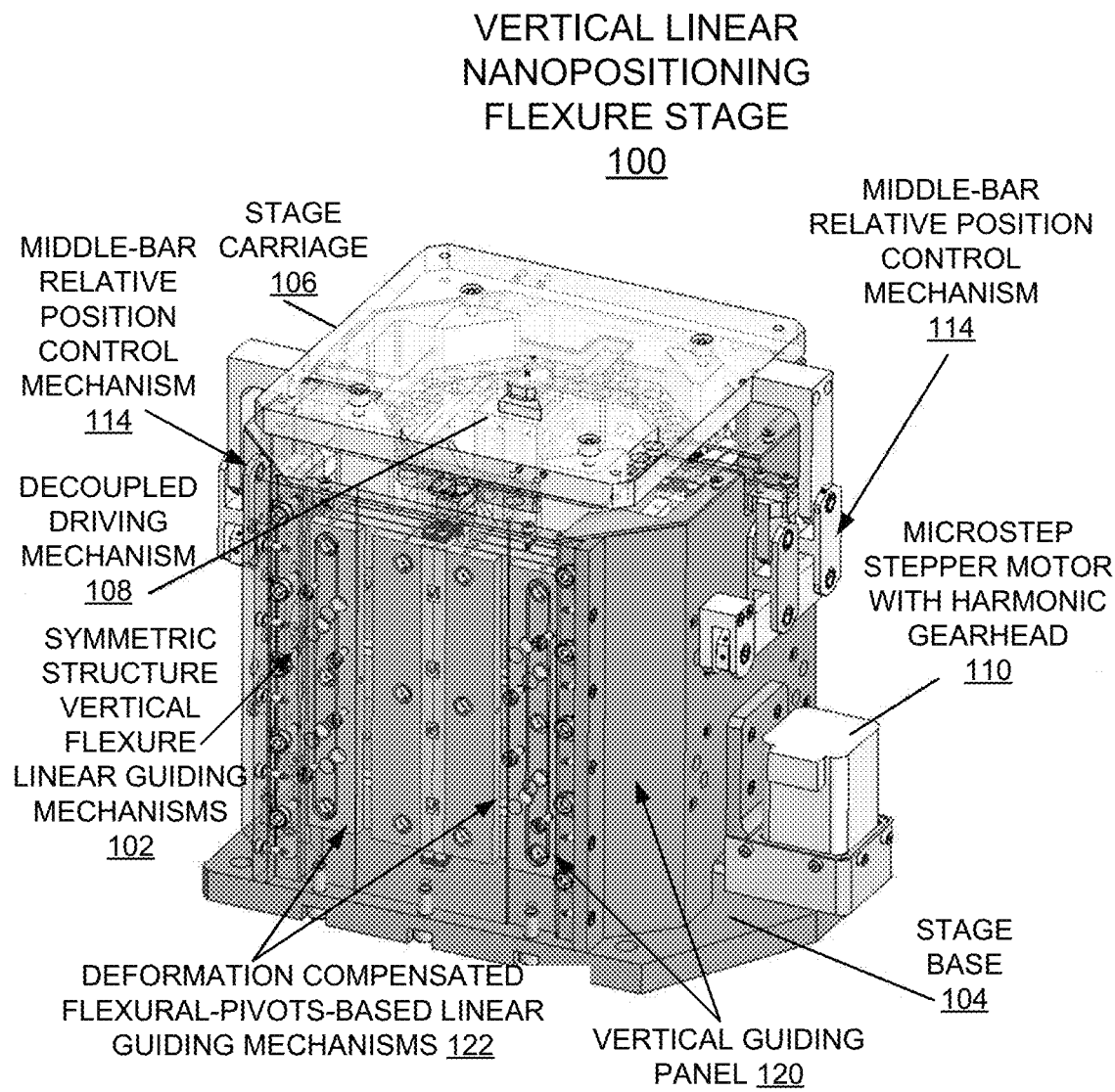
FIGS. 1, 2, 3, 4A, 4B, 4C, 4D, and 5 schematically illustrate not to scale an example vertical linear nanopositioning flexure stage of precision nanopositioning apparatus for implementing enhanced nanopositioning performance in accordance with a preferred embodiment.

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and precision nanopositioning apparatus including vertical and horizontal linear nanopositioning flexure stages are provided for implementing enhanced nanopositioning performance in accordance with a preferred embodiment. The precision nanopositioning apparatus provides compact linear nanopositioning flexure stages with high performance and stability.

Having reference now to the drawings, in FIGS. 1, 2, 3, 4A, 4B, 4C, 4D and 5, there is shown an example vertical linear nanopositioning flexure stage generally designated by the reference character 100 for implementing enhanced nanopositioning performance in accordance with a preferred embodiment.

Figure 6A:
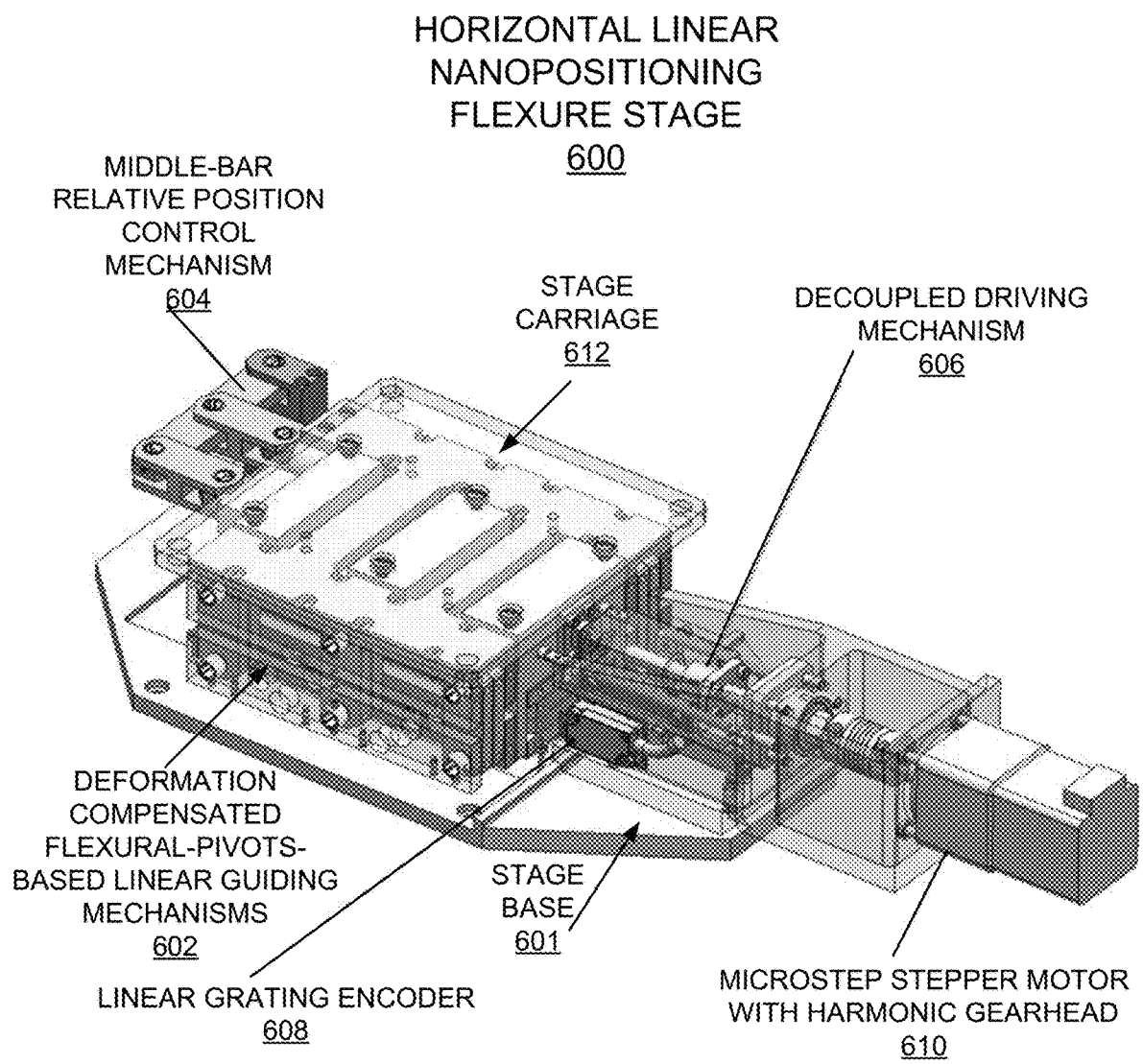
FIGS. 6A, 6B, 7, and 8 schematically illustrate not to scale an example horizontal linear nanopositioning flexure stage of precision nanopositioning apparatus for implementing enhanced nanopositioning performance in accordance with a preferred embodiment.
Figure 7:
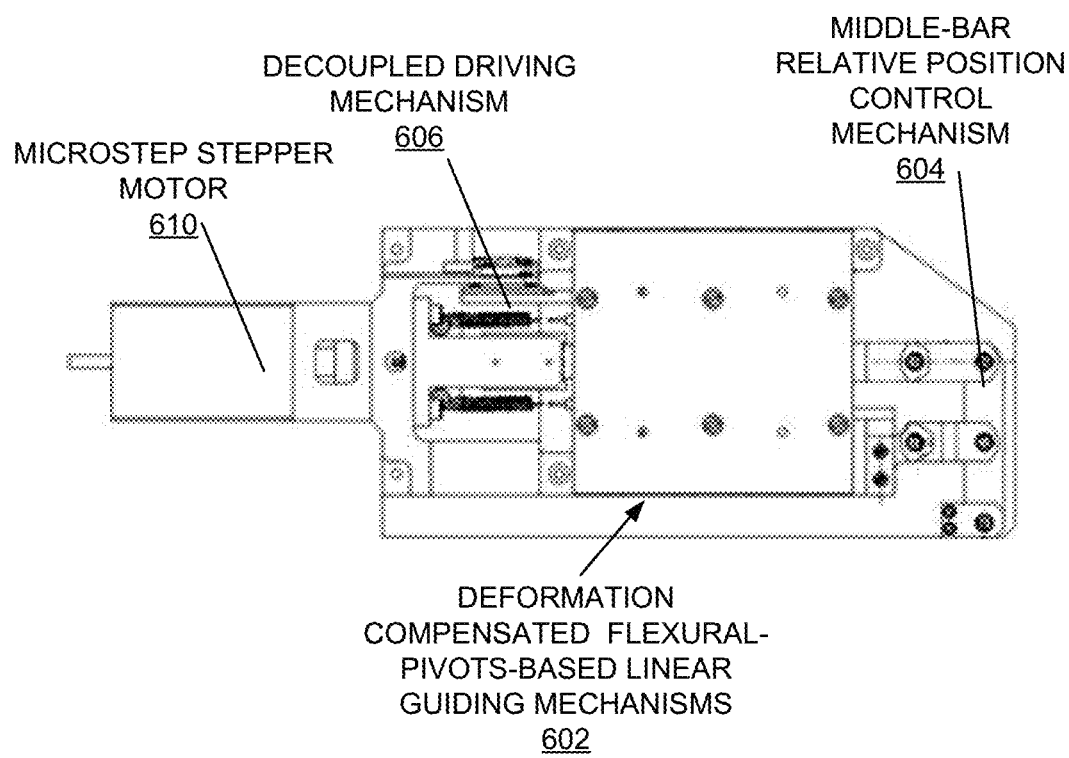
Figure 8:
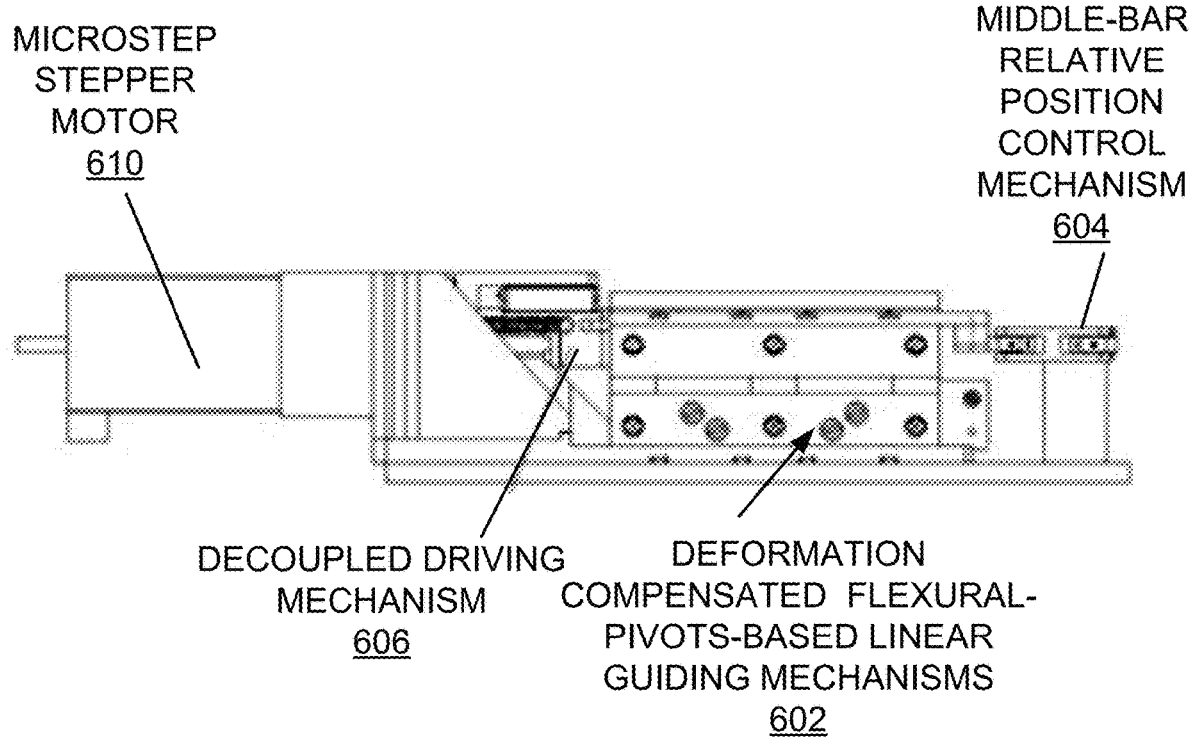
Figure 9:
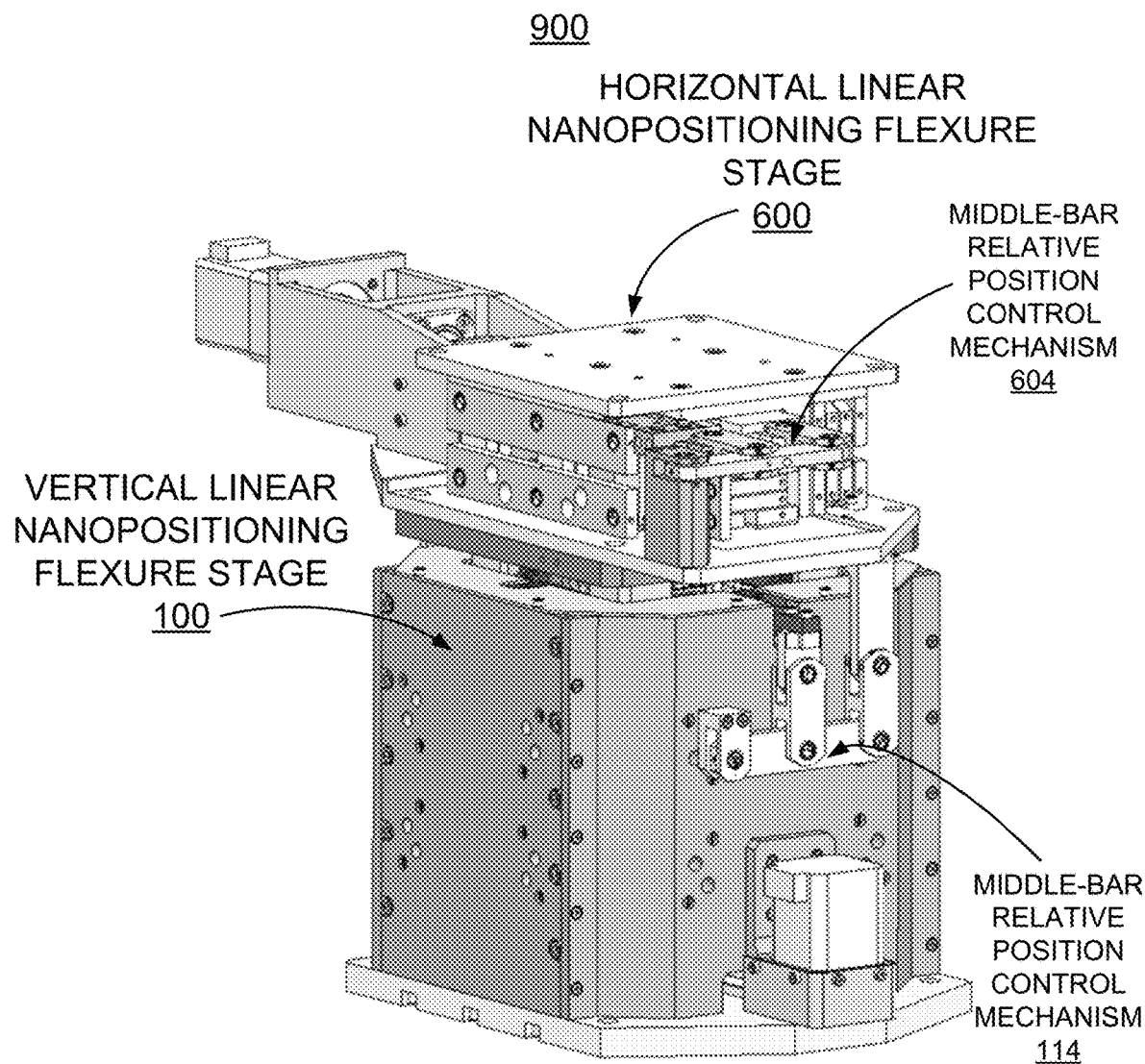
FIG. 9 schematically illustrates not to scale an example precision nanopositioning apparatus including vertical and horizontal linear nanopositioning flexure stages for implementing enhanced nanopositioning performance in accordance with a preferred embodiment.

In accordance with features of the invention, as illustrated in FIG. 9, precision nanopositioning apparatus 900 in accordance with a preferred embodiment includes vertical linear nanopositioning flexure stage 100 together with an example horizontal linear nanopositioning flexure stage generally designated by the reference character 600 in accordance with a preferred embodiment illustrated in FIGS. 6A, 7, and 8.

In FIGS. 1, 2, 3, 4A, 4B, 4C, 4D and 5, FIGS. 6A, 6B, 7, 8 and 9, the same reference characters are used for identical and similar components.

Referring to FIGS. 1, 2, 3, 4A, 4B, 4C, 4D and 5, the vertical linear nanopositioning flexure stage 100 includes basic deformation compensated linear guiding mechanisms 102 configured as a symmetrically configured flexure linear guiding mechanism with precision motion enhancement structure, a stage base 104, and a stage carriage 106. The vertical linear nanopositioning flexure stage 100 includes a decoupled linear driving mechanism 108, for example, driven by a micro-step stepper motor 110 with harmonic gearhead.

In accordance with features of the invention, as shown in FIGS. 1-3, 4A, 4B, 4C, 4D, and 5, the vertical linear nanopositioning flexure stage 100 includes a novel middle-bar relative position control mechanism generally designated by the reference character 114. The new middle-bar relative position control mechanism 114 enhances the stiffness of the parallel flexure linear guiding mechanism.

Vertical linear nanopositioning flexure stage 100 has a design, for example, based on the requirement of a sample scanning stage for x-ray microscope with 4 kg vertical load. For example, the initial design goal for the vertical linear nanopositioning flexure stage 100 is to develop a flexural nanopositioning vertical linear stage with a travel range of 12-16 mm, load capacity of 2-4 kg, and dimensions within 146 (L)×185 (W)×160 (H) mm. A particular selected travel range and selected load capacity implemented by the vertical linear nanopositioning flexure stage 100 is based upon different types of flexural pivots that are installed. For example, vertical linear flexure stage 100 provides minimal incremental motion of 2 nm and a maximum driving speed of 0.5 mm/second.

Vertical linear nanopositioning flexure stage 100 includes vertical flexure linear guiding mechanism 102 having a symmetric structure with four vertical guiding panels 120. Each guiding panel 120 includes two sets of the deformation-compensated flexural-pivots-based linear guiding mechanisms 122 which are mounted vertically between the stage base 104 and carriage 106 to provide a precision frictionless vertical motion guiding.

In accordance with features of the invention, the vertical linear nanopositioning flexure stage 100 has a total of eight sets of flexural guiding mechanisms 122 applied on the stage. To enhance the stiffness of the parallel flexure linear guiding mechanisms, the new middle-bar relative position control mechanism 114 is applied to the vertical linear nanopositioning flexure stage 100.

U.S. Pat. No. 8,957,567 discloses deformation compensated flexure pivots and deformation compensated flexural pivot-based parallel mechanisms of the type advantageously used in the precision nanopositioning apparatus 900 including vertical and horizontal linear nanopositioning flexure stages 100, 600 for implementing enhanced nanopositioning performance. The subject matter of the above-identified U.S. Pat. No. 8,957,567 is incorporated herein by reference.

Figure 2:
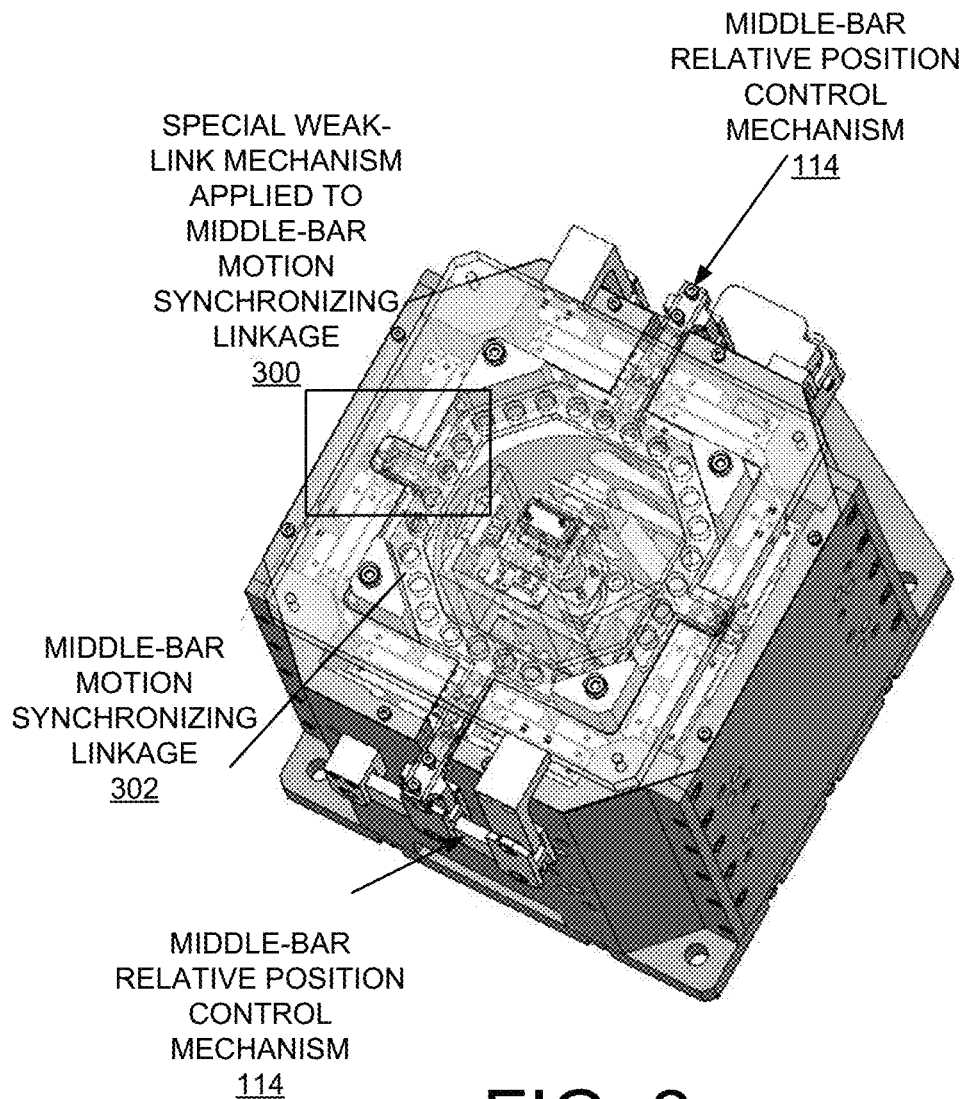
Figure 3:
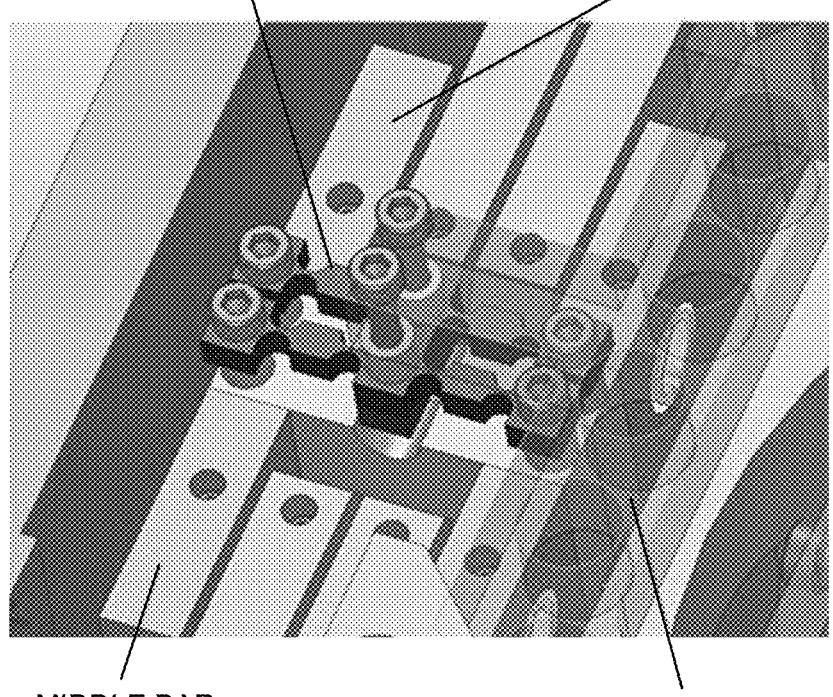

Referring to FIGS. 2 and 3, a detail generally designated by reference character 300 is shown in FIG. 2, with an enlarged view of the special weak-link mechanism 306 applied to a middle-bar motion synchronizing linkage 302 with a respective middle bar 304 shown in FIG. 3.

In accordance with features of the invention, to implement the precision motion enhancement for this symmetric linear guiding structure 102, special weak-link mechanisms 306 are applied to the middle-bar motion synchronizing linkage 302 to compensate relative motions between the middle-bars 304. The synchronizing linkages 302 between the U-shaped middle bars of the guiding mechanisms integrate the eight sets of guiding mechanisms 122 into a united stage guiding system 102.

U.S. Pat. No. 7,994,688 discloses a weak-link structure of the type that is advantageously included in the precision nanopositioning apparatus 900 including vertical and horizontal linear nanopositioning flexure stages 100, 600 for implementing enhanced nanopositioning performance. The subject matter of the above-identified U.S. Pat. No. 7,994,688 to Deming Shu is incorporated herein by reference.

Referring to FIGS. 4A, 4B, 4C, 4D and 5, respective top and side views of the vertical linear nanopositioning flexure stage 100 are shown including the symmetric structure vertical flexure linear guiding mechanisms 102 with eight sets of the deformation-compensated flexural-pivots-based linear guiding mechanisms 122.

The middle-bar relative position control mechanism 114 controls the relative position of the stage carriage 106 and the middle bar 304 with fixed relation of the middle bar 304.

Preliminary analyses and proof-of-principle testing for the vertical linear nanopositioning flexure stage 100 has shown that features of the invention have been successfully implemented. Each of the deformation-compensated flexural-pivots-based linear guiding mechanisms 122 has a nanometer-level positioning capability, limited by the decoupled driving mechanism 108 and stepper motor 110.

Figure 4A:
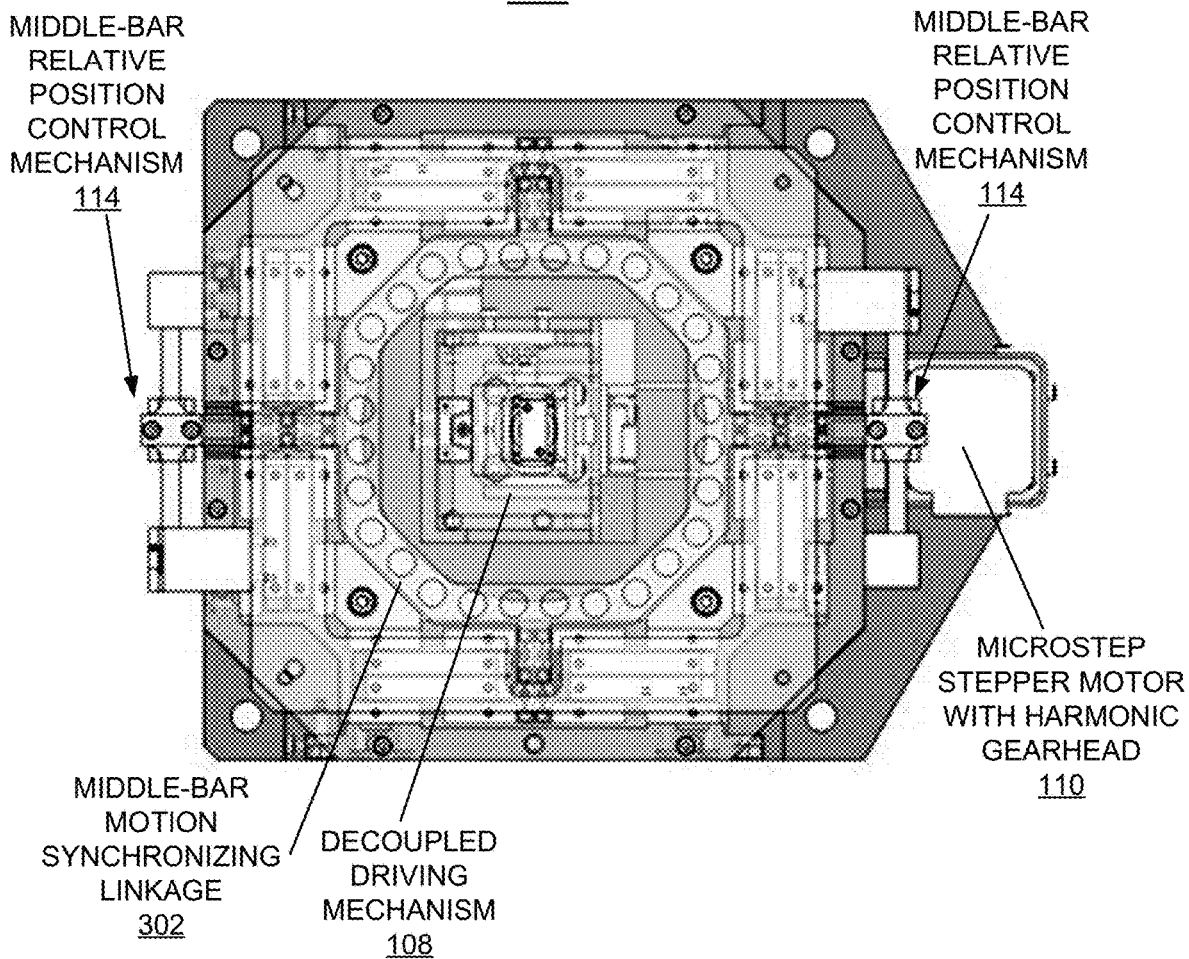

In FIG. 4A, the vertical linear nanopositioning flexure stage 100 is shown with the decoupled linear driving mechanism 108, for example, driven by the micro-step stepper motor 110 with harmonic gearhead.

Figure 4B:
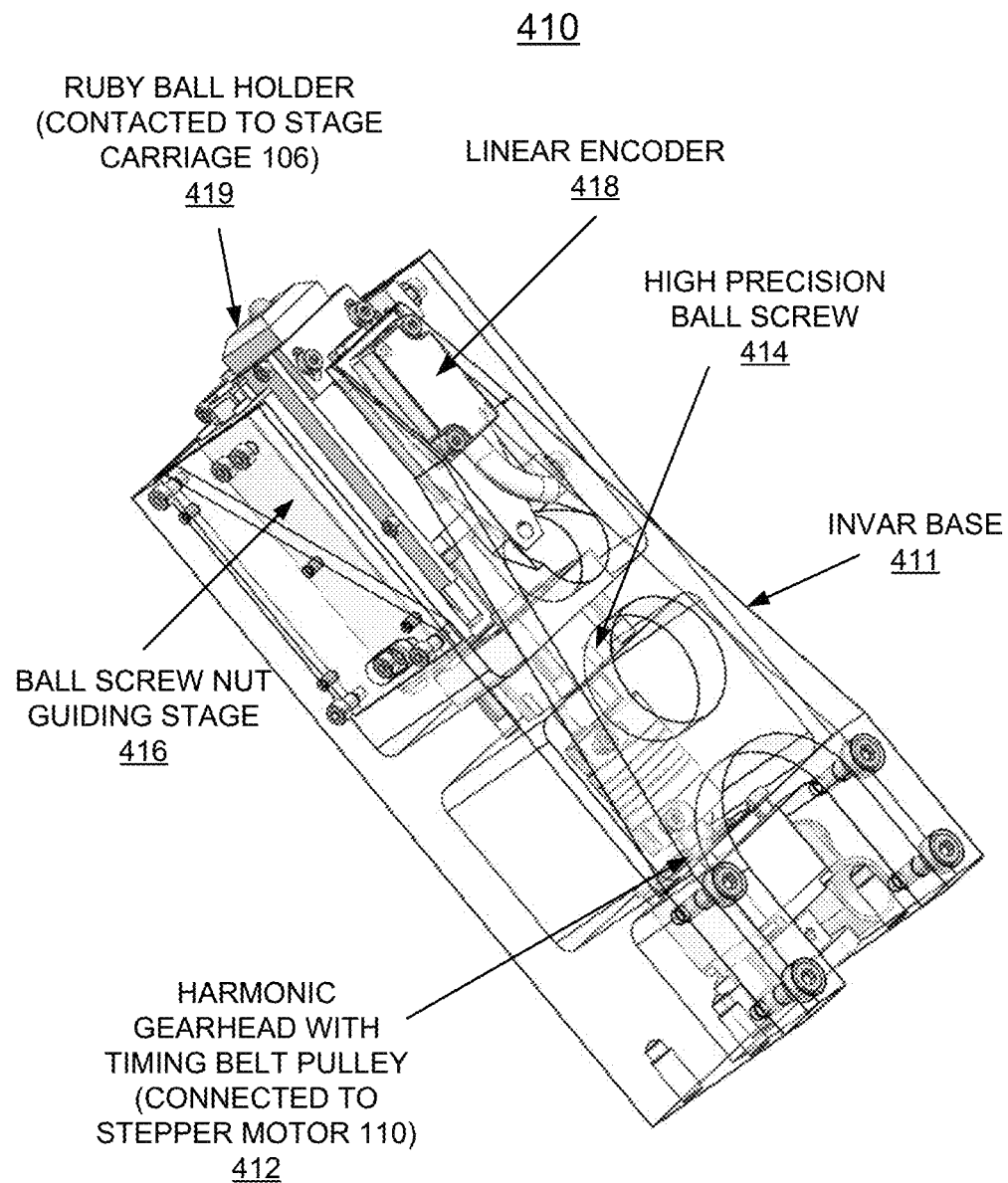

FIG. 4B, an example primary driving system generally designated by reference character 410 includes an invar base 411, and a harmonic gearhead and timing belt pulley 412 is connected to the micro-step stepper motor 110. Driving system 410 includes a high precision ball screw 414, a ball screw nut guiding stage 416, a linear encoder 418 and a Ruby ball holder 419 contacted to the stage carriage 106. The timing belt of harmonic gearhead and timing belt pulley 412 is applied to the driving mechanism to set the motor 110 outside the stage. This primary driving system 410 reduces the thermal drifting caused by the stepper motor 110. However, primary driving system 410 can increase the stage bidirectional driving backlash. The advantage of this primary driving system 410 is its nanopositioning capability using a single actuator smoothly driving over the entire 16 mm travel range with 0.5 mm/sec maximum speed.

Figure 4C:
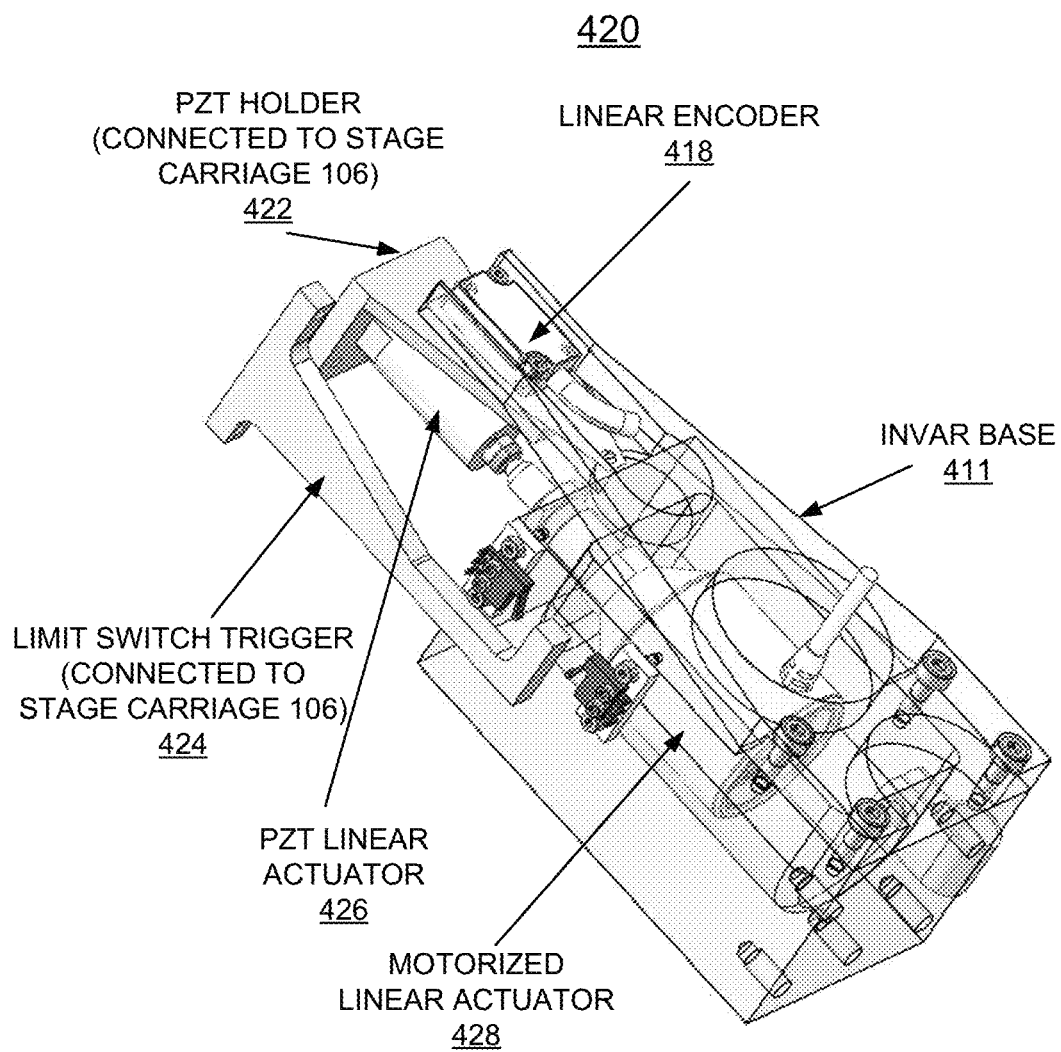

FIG. 4C, an example optional driving system generally designated by reference character 420 includes invar base 411, and a linear encoder 418. Driving system 420 includes a PZT holder 422 and a limit switch trigger 424, each connected to the stage carriage 106. Driving system 420 includes a PZT linear actuator 426 and a motorized linear actuator 428. For applications which advantageously use a combination of coarse and fine actuators, the optional driving mechanism 420, for example, using a combination of PI™ P-841.10 PZT linear actuator 426 and Newport™ NSA-12 motorized linear actuator 428 is provided. With this combination of optional driving system 420, sub-nanometer positioning resolution can be reached with PZT strain gauge closed-loop control in the 15 micron PZT travel range. Limited by the travel range of NSA-12 motorized actuator 428, the stage's overall travel range and load capacity will be limited to 11 mm and 2 kg with driving system 420.

Figure 4D:
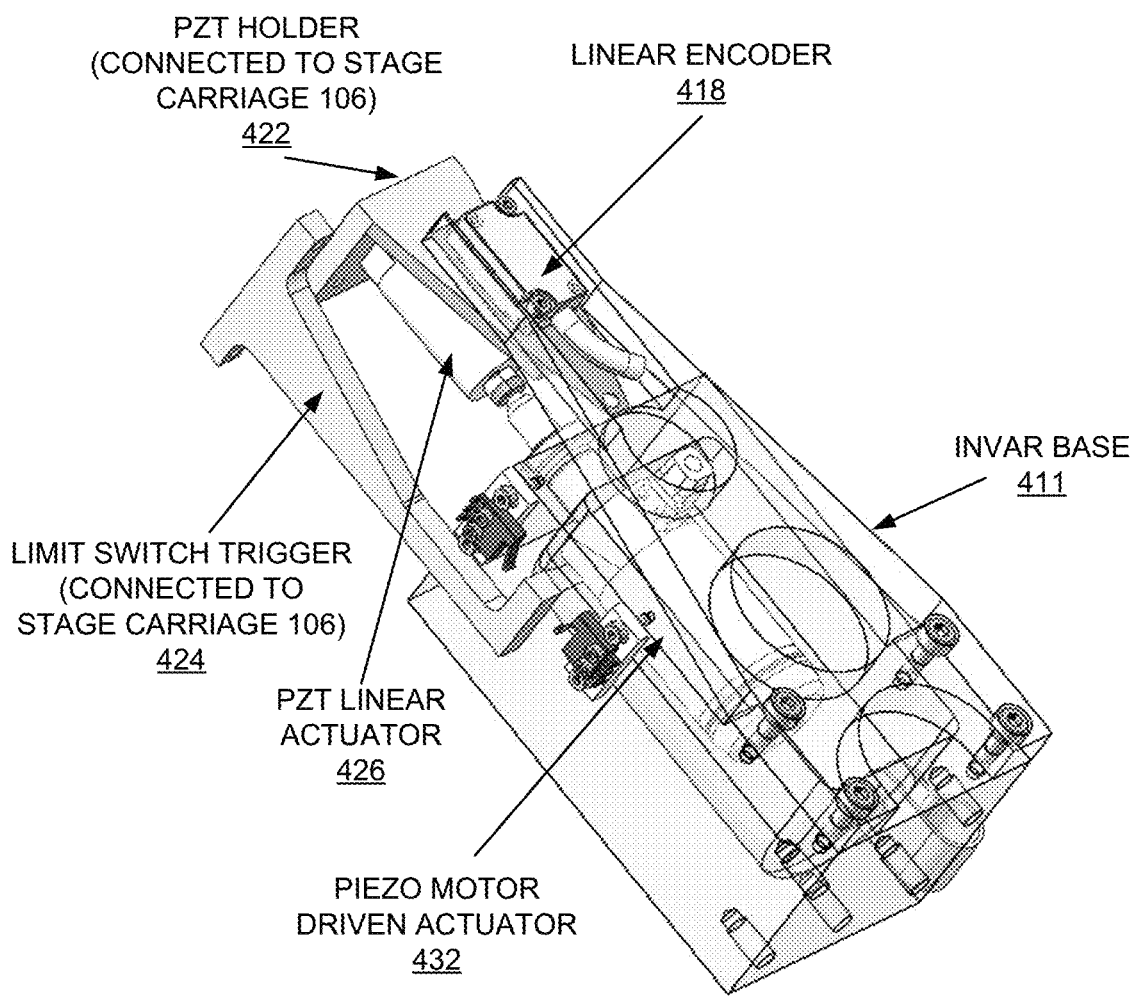
Figure 5:
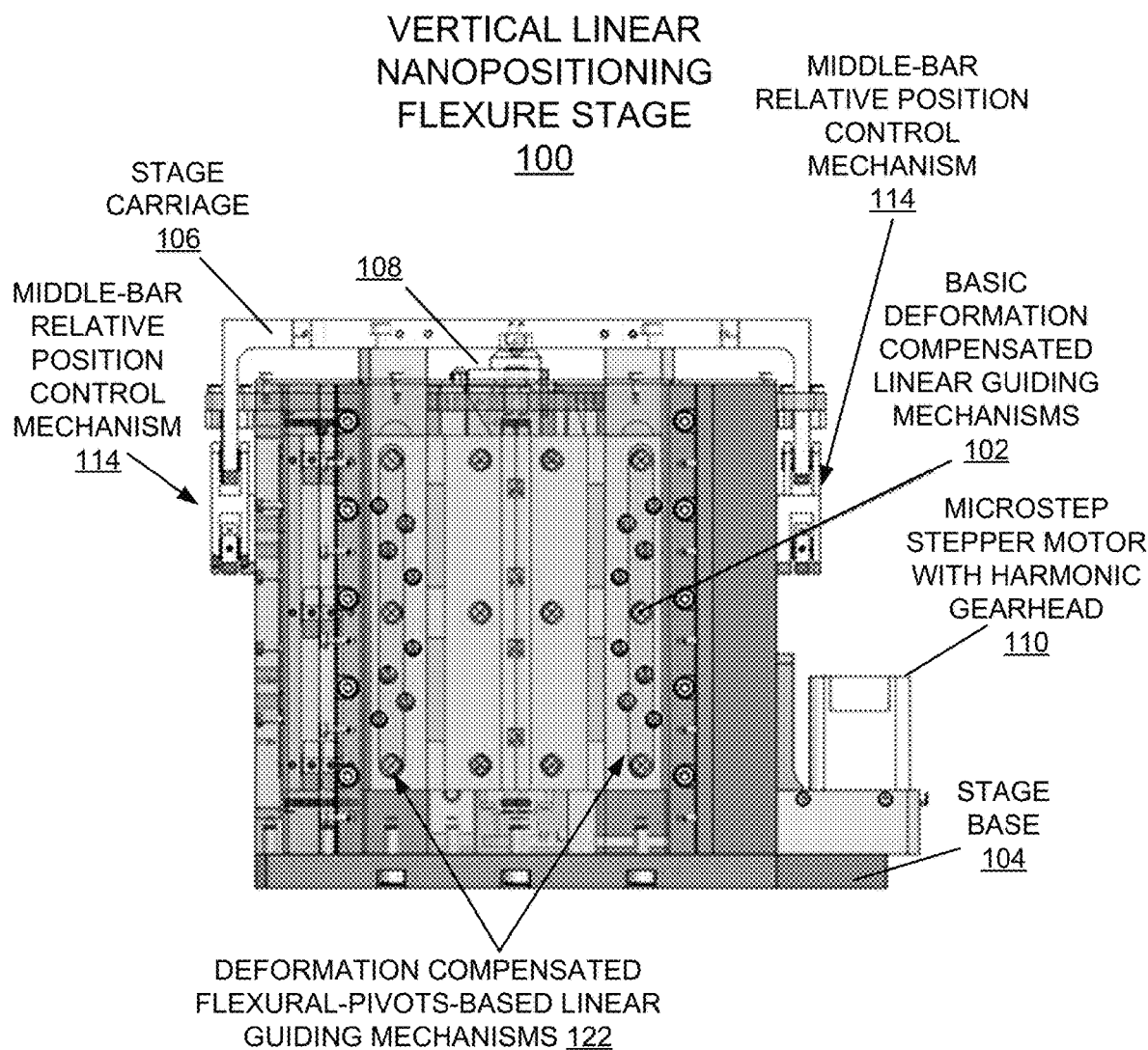

FIG. 4D, another example optional driving system generally designated by reference character 430 includes invar base 411, and linear encoder 418, PZT holder 422 and limit switch trigger 424, each connected to the stage carriage 106. Driving system 420 includes PZT linear actuator 426 and a piezo motor driven actuator 432. For applications which is focused on high stability for each positioned point, but less concerned with the smoothness of the driving speed, for example Newport™ PZA-12 piezo motor driven actuator 432 can provide 30 nm minimum incremental motion with maximum speed of 0.2 mm/sec over 12.5 mm coarse travel range and with no loss of position when power is removed. Combined with, for example, PI™ P-841.10 PZT linear actuator 426, this driving system 430 can also provide subnanometer positioning resolution as shown in FIG. 4D.

Preliminary testing of the nanometer-level positioning capability of the vertical linear flexural stage 100 has been tested with Attocube™ laser-interferometric-based displacement sensor system FPS3010 which is mounted on an invar frame. Testing of the vertical stage positioning sensitivity with three-up and threedown ~2.7 nm steps driven by a PI™ P-841.10 PZT linear actuator 426 under PZT strain gauge closed-loop control. Testing of the T8-55 vertical linear flexure stage positioning sensitivity with five ~2.5 nm steps driven by a microstep stepper motor 110 under open-loop control.

Maximum driving speed has been tested for the vertical linear flexural stage 100. An approximate 0.5 mm/sec driving speed performed by the vertical flexure stage driven by Oriental Motor™ micro-step stepper motor 110 with microsteps (2 nm/microstep) under a pulse rate of 250 k pulse/sec.

Also a 14 mm travel range test with the same micro-step stepper motor based driving mechanism is provided.

Effective linear motion straightness of trajectory has been shown for the vertical linear flexural stage 100 with both driving mechanism options driven by micro-step stepper motor. Also example tests have shown effective repeatability for the linear motion straightness of trajectory, for example, in the level of a few micro-radians typically. The preliminary tests of the vertical linear flexural stage 100 were performed under a 4 kg vertical load.

Figure 6B:
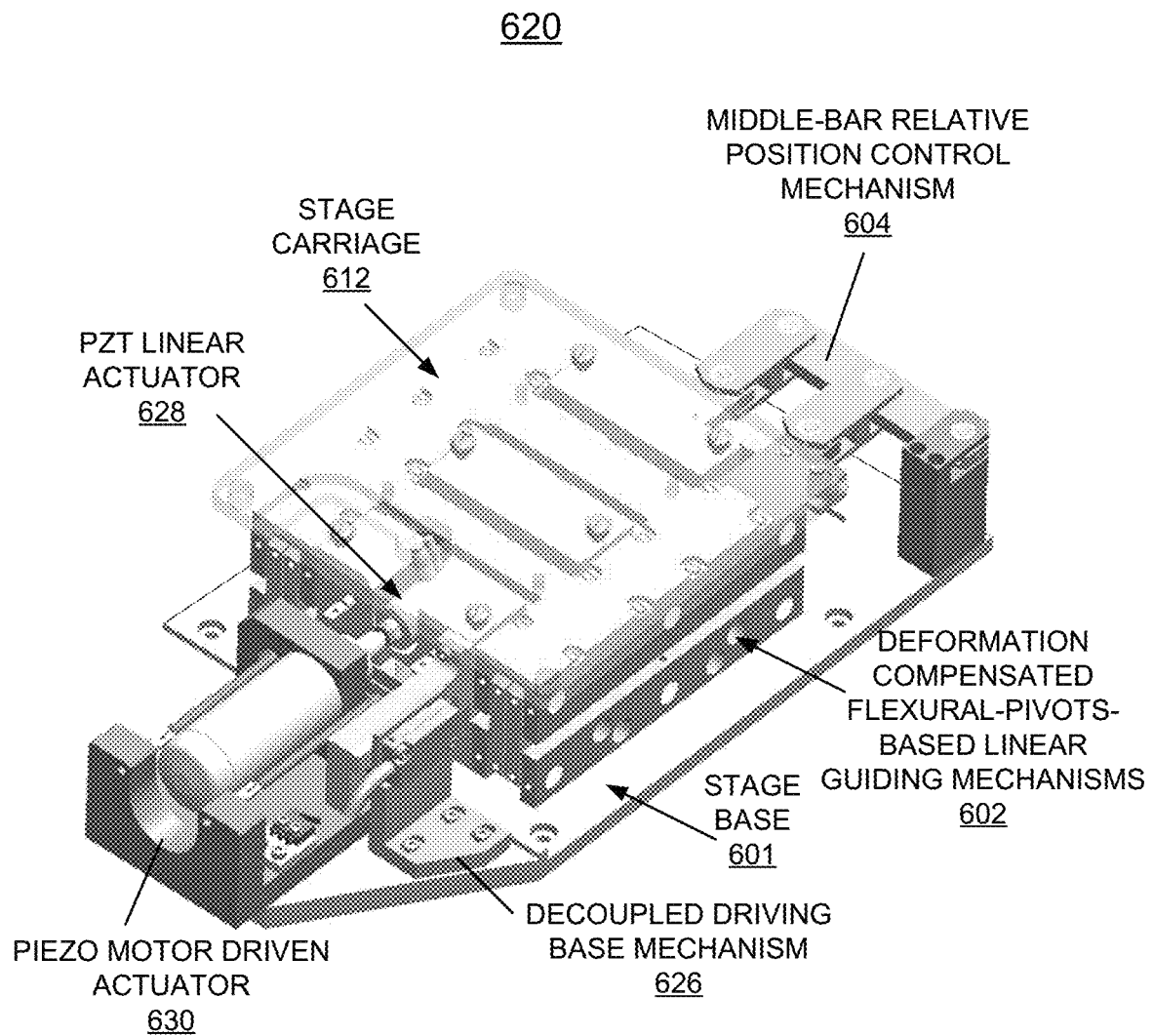

Referring to FIGS. 6A, 6B, 7, and 8, there is shown an example horizontal linear nanopositioning flexure stage generally designated by the reference character 600 of precision nanopositioning apparatus 900 for implementing enhanced nanopositioning performance in accordance with a preferred embodiment. FIG. 6A is a perspective view showing a three dimensional (3-D) model of the horizontal linear flexure stage 600. FIG. 6B is a perspective view showing a three dimensional (3-D) model of the horizontal linear flexure stage generally designated by the reference character 620 with an alternative drive system. FIGS. 7 and 8 are respective top and side plan views of the horizontal linear flexure stage 600. The horizontal linear nanopositioning flexure stage 600 is mounted on the stage carriage 106 of the vertical linear nanopositioning flexure stage 100.

The horizontal linear nanopositioning flexure stage 600 includes, for example, three sets of deformation compensated linear guiding mechanisms 602 for the linear flexural stage. The horizontal linear nanopositioning flexure stage 600 includes a middle-bar relative position control mechanism 604 coupled to deformation-compensated flexural-pivots-based linear guiding mechanisms 602 to enhance the stiffness of the flexure linear guiding mechanisms 602. The horizontal linear flexure stage 600 includes a decoupled linear driving mechanism 606 together with a linear grating encoder 608, for example, driven by a micro-step stepper motor 610 with harmonic gearhead.

Two sets of the linear guiding mechanisms 602 are mounted vertically between a stage base 601 and a stage carriage 612. One set of the linear guiding mechanism 602 links the stage base 601 and carriage 612 horizontally. Synchronizing linkages between the U-shaped middle bars of the three sets of guiding mechanisms 602 integrate the three sets of guiding mechanisms into a united guiding system.

For example, horizontal linear flexure stage 600 optionally is designed for a horizontal sample scanning stage for x-ray microscope, for example, with a travel range of 12-16 mm, load capacity of 1-2 kg, and compact dimensions within 125 (L)×347 (W)×52 (H) mm. The stage's travel range and load capacity vary for the different types of flexural pivots that are installed. For example, horizontal linear flexure stage 600 provides minimal incremental motion of 2 nm and a maximum driving speed of 1 mm/second.

A special 1:2 ratio flexure mechanism is applied to the linear stage 600 to provide a backlash-free reliable 1:2 positioning link between the middle-bar control 604 and the carriage 106 of the stage 600.

For example, the linear grating encoder 606 is implemented with a MicroE™ MII 6850 linear grating encoder with 10-nm resolution from MicroE Systems of Bedford, Mass. 01730 USA.

FIG. 6B is a perspective view showing a three dimensional (3-D) model of an example horizontal linear flexure stage generally designated by the reference character 620 with an alternative drive system. The horizontal linear flexure stage 620 includes an alternative driving mechanism. The horizontal linear flexure stage 620 includes a decoupled driving base mechanism 626. The horizontal linear flexure stage 620 includes a PZT linear actuator 628 together with a piezo motor driven actuator 630. Horizontal linear flexure stage 620 is provided such as for applications focused on high stability for each positioned point, but less concerned with the smoothness of the driving speed. For example, Newport™ PZA-12 piezo motor driven actuator 630 can provide 30 nm minimum incremental motion with maximum speed of 0.2 mm/sec over 12.5 mm coarse travel range and with no loss of position when power is removed. For example, combined with PI™ P-841.10 PZT linear actuator 628, this driving mechanism option of horizontal linear flexure stage 620 can also provide subnanometer positioning resolution.

Referring to FIG. 9, there is shown precision nanopositioning apparatus 900 including vertical and horizontal linear nanopositioning flexure stages 100, 600 for implementing enhanced nanopositioning performance in accordance with a preferred embodiment.

Enhanced mechanical design of precision nanopositioning apparatus 900 in accordance with features of the invention has been successfully implemented and tested at Argonne National Laboratory (ANL) including the mechanical design and finite element analysis of the vertical and horizontal linear flexural stages. Additional comprehensive mechanical tests for the vertical and horizontal linear flexural stages with a laser interferometer system are in progress.

In brief summary, novelty of the new mechanical design of the precision nanopositioning apparatus 900 includes its frictionless flexural-pivots-based precision middle-bar relative position control mechanisms 114, 604 of vertical and horizontal linear nanopositioning flexure stages 100, 600 for implementing enhanced nanopositioning performance. Such middle-bar relative position control mechanisms 114, 604 improve the linear motion trajectory accuracy of the nanopositioning flexure stages 100, 600 significantly.

The new mechanical design of the precision nanopositioning apparatus 900 advantageously is applied to developments in multiple fields, such as ultra-precision linear positioning stages for scanning x-ray microscope and nano-probe, ultra-precision alignment and manipulation apparatus for x-ray optics and optical instrumentation for diffraction limited Synchrotron Radiation Sources, hard x-ray free-electron laser facilities, and hard x-ray free-electron laser Oscillator Cavities. Also precision nanopositioning apparatus 900 advantageously is used with nanotechnology and semiconductor manufacturing equipment, alignment apparatus for optics engineering and advanced robotic system with nanopositioning capability in a dusty and harsh environment.

While the present invention has been described with reference to the details of the embodiments of the invention shown in the drawing, these details are not intended to limit the scope of the invention as claimed in the appended claims.

What is claimed is:

1. An enhanced precision nanopositioning apparatus for implementing enhanced nanopositioning performance comprising:
  a vertical linear nanopositioning flexure stage;
  a horizontal linear nanopositioning flexure stage mounted on said vertical linear nanopositioning flexure stage;
  said vertical linear nanopositioning flexure stage includes a stage base, a symmetrically configured flexure linear guiding mechanism with precision motion enhancement structure, and a stage carriage;

said horizontal linear nanopositioning flexure stage includes a flexure linear guiding mechanism, and a middle-bar relative position control mechanism to enhance the stiffness of said flexure linear guiding mechanism.

2. The enhanced precision nanopositioning apparatus as recited in claim 1, wherein said symmetrically configured flexure linear guiding mechanism includes a symmetric structure with four vertical guiding panels.

3. The enhanced precision nanopositioning apparatus as recited in claim 2, wherein each guiding panel includes two sets of the deformation-compensated flexural-pivots-based linear guiding mechanism.

4. The enhanced precision nanopositioning apparatus as recited in claim 3, wherein said guiding panels are mounted vertically between the stage base and the stage carriage to provide a precision frictionless vertical motion guiding.

5. The enhanced precision nanopositioning apparatus as recited in claim 1, wherein a total of eight sets of flexural guiding mechanisms are applied on said vertical linear nanopositioning flexure stage.

6. The enhanced precision nanopositioning apparatus as recited in claim 1, wherein said precision motion enhancement structure for said symmetrically configured linear guiding structure includes a middle-bar motion synchronizing linkage.

7. The enhanced precision nanopositioning apparatus as recited in claim 6, wherein said weak-link mechanisms compensate transversal relative motions between middle-bars of said middle-bar motion synchronizing linkage.

8. The enhanced precision nanopositioning apparatus as recited in claim 1, wherein flexure linear guiding mechanism of said horizontal linear nanopositioning flexure stage includes three sets of deformation-compensated flexural linear guiding mechanisms.

9. The enhanced precision nanopositioning apparatus as recited in claim 8, wherein two sets of said three sets of linear guiding mechanisms are mounted vertically between a stage base and a stage carriage.

10. The enhanced precision nanopositioning apparatus as recited in claim 8, wherein one set of said three sets of linear guiding mechanisms links a stage base and a stage carriage horizontally.

11. The enhanced precision nanopositioning apparatus as recited in claim 8, wherein synchronizing linkages between U-shaped middle bars of said three sets of linear guiding mechanisms integrate said three sets of linear guiding mechanisms into a united guiding system.

12. The enhanced precision nanopositioning apparatus as recited in claim 1, wherein said horizontal linear nanopositioning flexure stage enables nanometer scale positioning resolution with structural stability and repeatability in nanometer scale.

13. The enhanced precision nanopositioning apparatus as recited in claim 12, wherein said horizontal linear nanopositioning flexure stage is a compact structure having kilograms-level load capacity and scalability.

14. The enhanced precision nanopositioning apparatus as recited in claim 1, wherein said vertical linear nanopositioning flexure stage enables enhanced performance nanometer scale positioning resolution with structural stability and repeatability in nanometer scale.

15. The enhanced precision nanopositioning apparatus as recited in claim 14, wherein said vertical linear nanopositioning flexure stage is a compact structure having kilograms-level load capacity and scalability.

16. The enhanced precision nanopositioning apparatus as recited in claim 1, wherein said horizontal linear nanopositioning flexure stage includes a microstep stepper motor and a decoupled driving mechanism.

17. The enhanced precision nanopositioning apparatus as recited in claim 1, wherein said vertical linear nanopositioning flexure stage includes a microstep stepper motor and a decoupled driving mechanism.

18. An enhanced precision nanopositioning method for implementing enhanced nanopositioning performance comprising:

providing a vertical linear nanopositioning flexure stage;

mounting a horizontal linear nanopositioning flexure stage mounted on said vertical linear nanopositioning flexure stage;

providing said vertical linear nanopositioning flexure stage with a stage base, a symmetrically configured flexure linear guiding mechanism with precision motion enhancement structure, and a stage carriage;

providing said horizontal linear nanopositioning flexure stage with a flexure linear guiding mechanism, and a middle-bar relative position control mechanism to enhance the stiffness of said flexure linear guiding mechanism.

19. The enhanced precision nanopositioning method as recited in claim 18, includes providing said vertical linear nanopositioning flexure stage with multiple sets of flexural guiding mechanisms, and a middle-bar relative position control mechanism including a middle-bar motion synchronizing linkage.

20. The enhanced precision nanopositioning method as recited in claim 19, includes providing weak-link mechanisms applied to said middle-bar motion synchronizing linkage.

* * * * *